(12) United States Patent
Shiga et al.

(10) Patent No.: US 7,857,991 B2
(45) Date of Patent: Dec. 28, 2010

(54) DICHROIC DYE COMPOSITION, AND LIQUID-CRYSTAL COMPOSITION AND LIQUID-CRYSTAL ELEMENT INCLUDING DICHROIC DYE

(75) Inventors: Yasushi Shiga, Tokyo (JP); Yuki Tanaka, Kanagawa (JP); Mio Ishida, Kanagawa (JP); Kazuhiro Tanaka, Tokyo (JP); Keita Kaifu, Tokyo (JP); Yukihiro Sano, Tokyo (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 12/015,875

(22) Filed: Jan. 17, 2008

(65) Prior Publication Data
US 2009/0033861 A1 Feb. 5, 2009

(30) Foreign Application Priority Data
Jan. 23, 2007 (JP) .......................... P2007-012840

(51) Int. Cl.
*C09K 19/00* (2006.01)
*C09K 19/06* (2006.01)
*C09K 19/52* (2006.01)
*G02F 1/1333* (2006.01)

(52) U.S. Cl. ............... 252/299.01; 252/299.2; 252/299.6; 252/299.1; 430/20; 428/1.1; 349/117

(58) Field of Classification Search ............ 252/299.01, 252/299.1, 299.6, 299.2; 430/20; 428/1.1
See application file for complete search history.

(56) References Cited
FOREIGN PATENT DOCUMENTS

| JP | 10-095980 | 4/1998 |
| JP | 2000-017266 | 1/2000 |
| JP | 2000-073064 | 3/2000 |
| JP | 2000-313881 | 11/2000 |

*Primary Examiner*—Geraldina Visconti
(74) *Attorney, Agent, or Firm*—SNR Denton US LLP

(57) ABSTRACT

Provided are a dichroic dye composition in which a solubility of the dichroic dye with respect to liquid-crystal is sufficiently high and a wavelength dispersion of absorbance is small in a wide wavelength range, and a black guest-host liquid-crystal composition indicating high order parameters using such a dichroic dye composition and a liquid-crystal element having high contrast. The dichroic dye composition includes at least one dichroic dye selected from Group (I) shown below, at least one dichroic dye selected from Group (II) shown below, and at least one dichroic dye selected from Group (III) shown below.

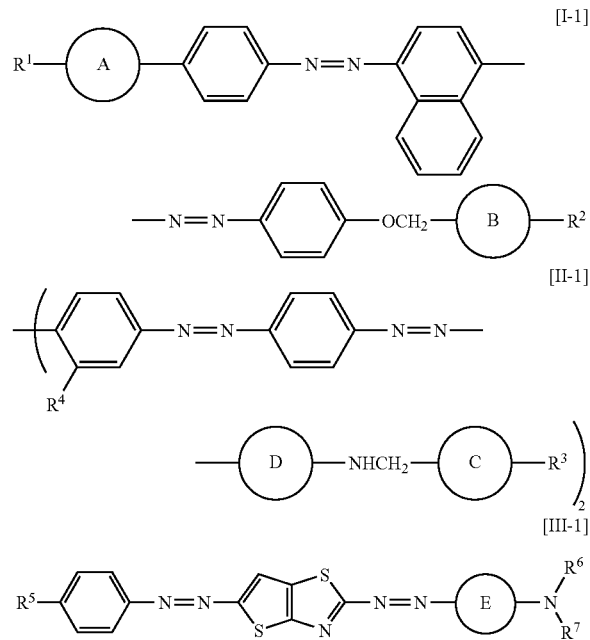

13 Claims, 2 Drawing Sheets

DICHROIC DYE COMPOSITION, AND LIQUID-CRYSTAL COMPOSITION AND LIQUID-CRYSTAL ELEMENT INCLUDING DICHROIC DYE

CROSS REFERENCES TO RELATED APPLICATIONS

The present invention contains subject matter related to Japanese Patent Application JP 2007-012840 filed in the Japanese Patent Office on Jan. 23, 2007, the entire contents of which being incorporated herein by reference.

BACKGROUND OF THE INVENTION

1. Field of the Invention

The present invention relates to a dichroic dye composition and a guest-host liquid-crystal composition used for a liquid-crystal element in a display element, a dimmer element, or the like, and to a liquid-crystal element using such a guest-host liquid-crystal composition.

2. Description of the Related Art

Liquid-crystal elements supporting liquid-crystal compositions between electrodes have been widely used for display elements such as notebook computers and personal data assistance (PDA), dimmer elements such as camera viewfinders capable of switching views, and the like, because of the space-saving and light-weight characteristics. Its application range has been widely spread year after year.

Most of currently-used liquid-crystal elements are mainly of twisted nematic (TN) type or super-twisted nematic (STN) type. However, because these elements use polarizers, there is disadvantage that the light-use efficiency is low. On the other hand, liquid-crystal elements applying the guest-host liquid-crystal compositions with dichroic dyes utilize the absorption anisotropy of the dichroic dyes so that the light-use efficiency is high without the polarizer. Thus, particularly in the case of reflective display elements not provided with backlights, luminous display can be achieved.

The dichroic dye indicates various absorption characteristics according to its dye structure; however, the dichroic dye mostly absorbs specific wavelengths such as red, blue, and yellow so that it is difficult to show black using a single dye. For this reason, three or more of a plurality of dichroic dyes are usually mixed in order to show black. Generally, the wavelength range of visible lights is thought to be from 380 nm to 780 nm, and it is recognized as "black", if the light absorption is constant in this range. However, in consideration of the standardized visual sensitivity curve of dark adaptation with regard to human visual sensitivity, the absorption is desirably constant in the wavelength range from 400 nm to 650 nm.

For the dichroic dye used for the guest-host display elements, various characteristics are also requested including high order parameters, high solubility with respect to the liquid-crystal, and the like. In the guest-host liquid-crystal compositions, the order parameters and the solubility with respect to the dichroic dye liquid-crystal largely affect display quality of the guest-host display elements in terms of contrast, color reproductivity, and the like. Among them, although the contrast can be improved by increasing concentration of the dichroic dye, transmissivity (or reflectivity) of decolorized colors is decreased correspondingly and the luminous display as a characteristic of the guest-host display elements is lost. Therefore, the abovementioned two characteristics are requested to be maintained at the same time.

However, because a single dichroic dye has various characteristics in the related art, in mixing system of a plurality of dichroic dyes, it is difficult to decrease the wavelength dispersion of absorbance in the wide wavelength range while satisfying the solubility and dichroism. Particularly, in the case that a host liquid-crystal is a fluorinated liquid-crystal composition, the reduction of the dye solubility is remarkable. Therefore, there has been a difficulty in the development of the guest-host liquid-crystal composition which indicates the high order parameters, with use of the fluorinated liquid-crystal.

As the guest-host liquid-crystal composition having the relatively high order parameters, some have been proposed in Japanese Unexamined Patent Publication Nos. 2000-313881, 2000-17266, and 2000-73064, and Japanese Unexamined Patent Publication No. Hei10-95980. However, in these patent documents, the order parameters in the wavelength range from 400 nm to 500 nm are reduced in comparison with the case of the wavelength range from 600 nm to 650 nm, and the present situation is that the guest-host liquid-crystal composition having the high order parameters in the entire wavelength range from 400 nm to 650 nm has not been provided.

SUMMARY OF THE INVENTION

In view of the foregoing, it is desirable to provide a dichroic dye composition in which a solubility of the dichroic dye with respect to liquid-crystal is sufficiently high and a wavelength dispersion of absorbance is small in a wide wavelength range, and a black guest-host liquid-crystal composition indicating high order parameters using such a dichroic dye composition and a liquid-crystal element having high contrast.

As a result of excessive studies made by the present inventors so as to solve the abovementioned issue that the contrast of the guest-host display element is not high due to the insufficient order parameters of the guest-host liquid-crystal composition using the fluorinated liquid-crystal material as the host liquid-crystal, the present inventors have found that the order parameters of the guest-host liquid-crystal composition have a superior character by a combination of a plurality of dichroic dye having a specific molecular structure and the fluorinated liquid-crystal material. The present invention has been completed on the basis of this finding.

According to an embodiment of the invention, there is provided

[1] a dichroic dye composition including at least one dichroic dye selected from Group (I) shown below; at least one dichroic dye selected from Group (II) shown below; and at least one dichroic dye selected from Group (III) shown below.

Group (I): dichroic azo dyes represented by the following general formula [I-1]:

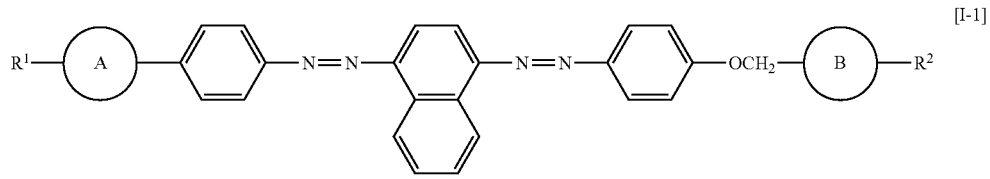

(where $R^1$ and $R^2$ each independently represents an alkyl group having 1 to 10 carbon atoms; an alkoxy group having 1 to 10 carbon atoms; an alkoxy-alkyl group having 2 to 12 carbon atoms; and a cycloalkyl group or a phenyl group which may be substituted by these alkyl group, alkoxy group, or alkoxy-alkyl group;

Ring A and Ring B each independently represents a 1,4-cyclohexanediyl group, or a 1,4-phenylene group);

Group (II): dichroic azo dyes represented by the following general formula [II-1]:

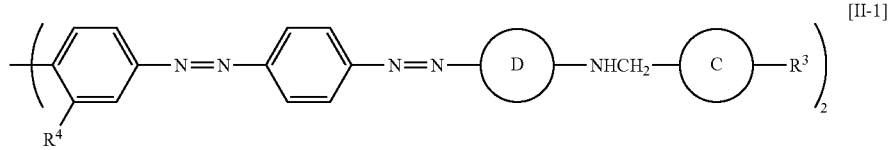

(where $R^3$ represents an alkyl group having 1 to 10 carbon atoms; an alkoxy group having 1 to 10 carbon atoms; an alkoxy-alkyl group having 2 to 12 carbon atoms; and a cycloalkyl group or a phenyl group which may be substituted by these alkyl group, alkoxy group, or alkoxy-alkyl group;

$R^4$ represents a hydrogen atom, a methyl group, a methoxy group, a halogen atom, or a fluoromethyl group;

Ring C represents a 1,4-cyclohexanediyl group, or a 1,4-phenylene group;

Ring D represents a 1,4-phenylene group, or a 1,4-naphthylene group);

Group (III): dichroic azo dyes represented by the following general formula [III-1];

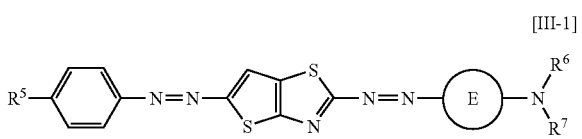

(where $R^5$ represents an alkyl group having 1 to 10 carbon atoms; an alkoxy group having 1 to 10 carbon atoms; an alkoxy-alkyl group having 2 to 12 carbon atoms; and a cycloalkyl group or a phenyl group which may be substituted by these alkyl group, alkoxy group, or alkoxy-alkyl group;

$R^6$ represents a hydrogen atom, or an alkyl group having 1 to 10 carbon atoms;

in the case that $R^6$ is an alkyl group, $R^7$ represents an alkyl group having 1 to 10 carbon atoms, and the total carbon number by adding the carbon numbers of $R^6$ and $R^7$ is from 2 to 8;

in the case that $R^6$ is a hydrogen atom, $R^7$ represents an alkyl group having 1 to 10 carbon atoms; or a cyclohexylm- ethyl group or a benzyl group whose 4-position may be substituted by a substituent R; here, R represents an alkyl group having 1 to 10 carbon atoms; an alkoxy group having 1 to 10 carbon atoms; an alkoxy-alkyl group having 2 to 12 carbon atoms; and a cycloalkyl group or a phenyl group which may be substituted by these alkyl group, alkoxy group, and alkoxy-alkyl group;

Ring E represents a 1,4-phenylene group, or a 1,4-naphthylene group).

[2] The dichroic dye composition according to the description [1] further includes at least one dichroic dye selected from Group (IV) shown below.

Group (IV): dichroic azo dyes represented by the following general formula [IV-1];

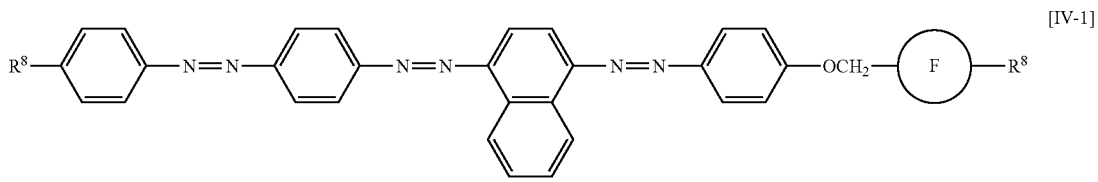

(where $R^8$ and $R^9$ each independently represents an alkyl group having 1 to 10 carbon atoms; an alkoxy group having 1 to 10 carbon atoms; an alkoxy-alkyl group having 2 to 12 carbon atoms; and a cycloalkyl group or a phenyl group which may be substituted by these alkyl group, alkoxy group, and alkoxy-alkyl group;

Ring F represents a 1,4-cyclohexanediyl group, or a 1,4-phenylene group).

According to an embodiment of the invention, there is provided

[3] a guest-host liquid-crystal composition including a dichroic dye composition and a host liquid-crystal described in the description [1] or [2].

[4] The guest-host liquid-crystal composition according to the description [3] is such that a host liquid-crystal is a fluorinated liquid-crystal composition.

According to an embodiment of the invention, there is provided

[5] a liquid-crystal element in which the guest-host liquid-crystal composition described in the description [3] or [4] is supported between a pair of electrode substrates at least one of which is transparent.

In an embodiment of the present invention, ring structures of Rings A to F in the general formulas [I-1] to [IV-1] are described as follows.

TABLE 1

| SUBSTITUENT | | |
|---|---|---|
| —(A)— | 1,4-cyclohexanediyl group | [cyclohexane] |
| —(B)— | 1,4-phenylene group | [phenylene] |
| —(C)— | 1,4-cyclohexanediyl group | [cyclohexane] |
| | 1,4-phenylene group | [phenylene] |
| —(D)— | 1,4-phenylene group | [phenylene] |
| | 1,4-naphthylene group | [naphthylene] |
| —(E)— | 1,4-phenylene group | [phenylene] |
| | 1,4-naphthylene group | [naphthylene] |
| —(F)— | 1,4-cyclohexanediyl group | [cyclohexane] |
| | 1,4-phenylene group | [phenylene] |

In the general formula [III-1], in the case that $R^6$ is a hydrogen atom, a cyclohexylmethyl group or a benzyl group whose 4-position may be substituted by a substituent R is represented by the following general formula (a) or (b).

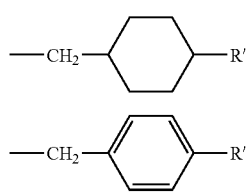

(where R' represents a hydrogen atom; an alkyl group having 1 to 10 carbon atoms; an alkoxy group having 1 to 10 carbon atoms; an alkoxy-alkyl group having 2 to 12 carbon atoms; and a cyclohexyl group or a phenyl group which may be substituted by these alkyl group, alkoxy group, and alkoxy-alkyl group).

According to an embodiment of the present invention, provided are a black dichroic dye composition which maintains a solubility and a high dichroism, and in which a wavelength dispersion of absorbance is small in the wide wavelength range usually from 450 nm to 650 nm and preferably from 500 nm to 650 nm, and a black guest-host liquid-crystal composition having high order parameters using thereof and a liquid-crystal element having the high contrast.

Other and further objects, features and advantages of the invention will appear more fully from the following description.

DETAILED DESCRIPTION OF THE PREFERRED EMBODIMENTS

Figure 1:
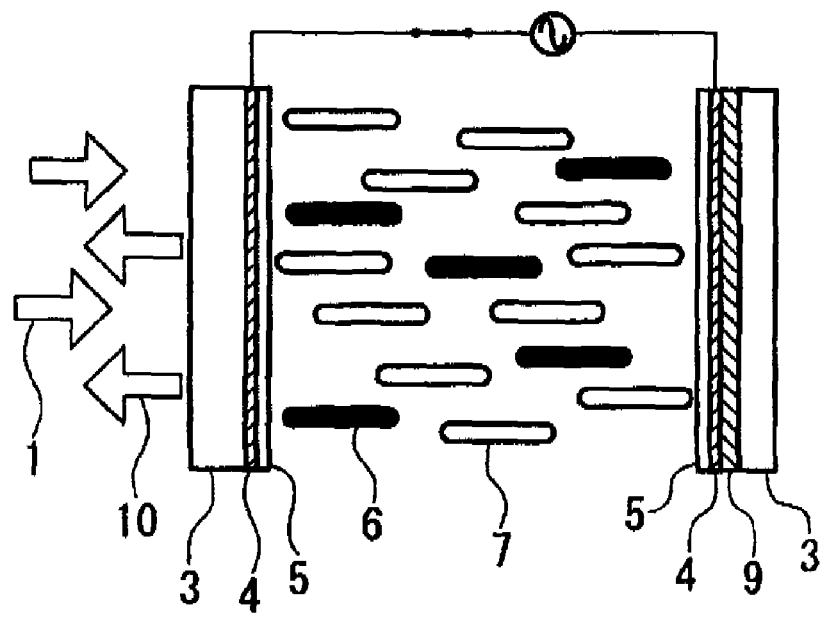
FIG. 1 is a schematic cross-sectional view of a voltage applied state of a reflective liquid-crystal element in a phase transition mode using an Np-type liquid-crystal composition as an example of a liquid-crystal element according to the present invention.

Hereinafter, embodiments of the present invention will be specifically described; however, the present invention is not limited to the embodiments as various modifications are possible within the range of the gist thereof.

The liquid-crystal composition of the present invention has a black dye, and the dye used in the present invention produces effects by a combination of the dichroic dyes represented by above Groups (I) to (III), or preferably and further by the dichroic dyes represented by above Group (IV).

Dichroic Dye Composition

<Dichroic Dye>

A dye used in the present invention will be described in detail.

Group (I): dichroic azo dyes represented by the following general formula [I-1].

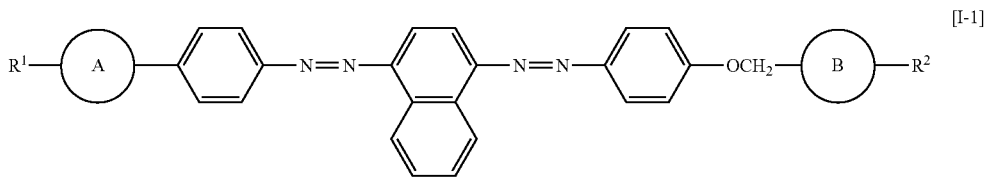

[I-1]

(where $R^1$ and $R^2$ each independently represents an alkyl group having 1 to 10 carbon atoms; an alkoxy group having 1 to 10 carbon atoms; an alkoxy-alkyl group having 2 to 12 carbon atoms; and a cycloalkyl group or a phenyl group which may be substituted by these alkyl group, alkoxy group, and alkoxy-alkyl group;

Ring A and Ring B each independently represents a 1,4-cyclohexanediyl group, or a 1,4-phenylene group).

The dye represented by the general formula [I-1] which constructs Group (I) is usually yellow. In the general formula [I-1], $R^1$ and $R^2$ each independently includes a straight-chain or branched-chain alkyl group having 1 to 10 carbon atoms such as a methyl group, a ethyl group, a propyl group, a butyl group, a pentyl group, a hexyl group, an octyl group, a nonyl group, or a dodecyl group; a straight-chain or branched-chain alkoxy group having 1 to 10 carbon atoms such as a methoxy group, an ethoxy group, a propoxy group, a butoxy group, a pentoxy group, or a octoxy group; or a straight-chain or branched-chain alkoxy-alkyl group having 2 to 12 carbon atoms such as a methoxymethyl group, a butoxymethyl group, an ethoxyethyl group, or a butoxyethyl group; a cycloalkyl group having 3 to 10 carbon atoms which may be substituted by these alkyl group, alkoxy group, and alkoxy-alkyl group; or a phenyl group which may be substituted by these alkyl group, alkoxy group, and alkoxy-alkyl group.

Preferred $R^1$ and $R^2$ each independently includes a straight-chain or branched-chain alkyl group having 1 to 10 carbon atoms; a straight-chain or branched-chain alkoxy group having 1 to 10 carbon atoms; a cyclohexyl group which is substituted by these alkyl group and alkoxy group; or a phenyl group which is substituted by these alkyl group and alkoxy group, and more preferably, each independently includes a straight-chain or branched-chain alkyl group having 1 to 10 carbon atoms; a straight-chain or branched-chain alkoxy group having 1 to 10 carbon atoms; and a cyclohexyl group which is substituted by these alkyl group and alkoxy group. In the case that a cyclohexyl group or a phenyl group is substituted, its substitution position is preferably at the 4-position and the stereochemistry of cyclohexane ring is preferably an E-isomer.

Ring A and Ring B each independently is a 1,4-cyclohexanediyl group, or a 1,4-phenylene group; and preferably a 1,4-cyclohexanediyl group and more preferably an (E)-1,4-cyclohexanediyl group.

Group (II): dichroic azo dyes represented by the following general formula [II-1].

(where $R^3$ represents an alkyl group having 1 to 10 carbon atoms; an alkoxy group having 1 to 10 carbon atoms; an alkoxy-alkyl group having 2 to 12 carbon atoms; and a cycloalkyl group or a phenyl group which may be substituted by these alkyl group, alkoxy group, and alkoxy-alkyl group;

$R^4$ represents a hydrogen atom, a methyl group, a methoxy group, a halogen atom, or a fluoromethyl group;

Ring C represents a 1,4-cyclohexanediyl group, or a 1,4-phenylene group;

Ring D represents a 1,4-phenylene group, or a 1,4-naphthylene group).

The dye represented by the general formula [II-1] which constructs Group (II) is usually red. In the general formula [II-1], $R^3$ includes a straight-chain or a branched-chain alkyl group having 1 to 10 carbon atoms such as a methyl group, an ethyl group, a propyl group, a butyl group, a pentyl group, a hexyl group, an octyl group, a nonyl group, or a dodecyl group; a straight-chain or branched-chain alkoxy group having 1 to 10 carbon atoms such as a methoxy group, an ethoxy group, a propoxy group, a butoxy group, a pentyloxy group, and a octyloxy group; or a straight-chain or branched-chain alkoxy-alkyl group having 2 to 12 carbon atoms such as a methoxymethyl group, a butoxymethyl group, an ethoxyethyl group, or a butoxyethyl group; a cycloalkyl group having 3 to 10 carbon atoms which may be substituted by these alkyl group, alkoxy group, and alkoxy-alkyl group; or a phenyl group which may be substituted by these alkyl group, alkoxy group, and alkoxy-alkyl group.

Preferred $R^3$ includes a straight-chain or branched-chain alkyl group having 1 to 10 carbon atoms; a straight-chain or branched-chain alkoxy group having 1 to 10 carbon atoms; a cyclohexyl group which is substituted by these alkyl group and alkoxy group; or a phenyl group which is substituted by these alkyl group and alkoxy group, and more preferably includes a straight-chain or branched-chain alkyl group having 1 to 10 carbon atoms; a straight-chain or branched-chain alkoxy group having 1 to 10 carbon atoms; and a cyclohexyl group which is substituted by these alkyl group and alkoxy group. In the case that a cyclohexyl group is substituted, its substitution position is preferably at the 4-position and the stereochemistry of cyclohexane ring is preferably the E-isomer.

$R^4$ includes a hydrogen atom; a methyl group; a methoxy group; a halogen atom such as a fluorine atom, a chlorine atom, and a bromine atom; and a fluoromethyl group such as a monofluoromethyl group, a difluoromethyl group, and a trifluoromethyl group.

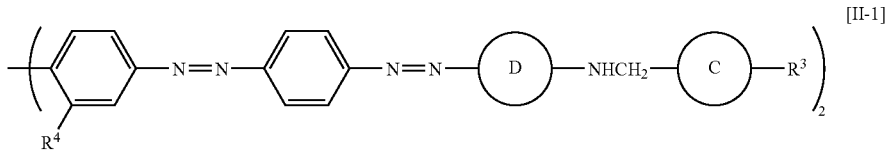

[II-1]

R⁴ preferably includes a methyl group; a methoxy group; and a fluoromethyl group. R⁴ more preferably includes a methyl group; a methoxy group; and a trifluoromethyl group.

Ring C is a 1,4-cyclohexanediyl group, or a 1,4-phenylene group; and preferably a 1,4-cyclohexanediyl group and more preferably (E)-cyclohexanediyl group.

Ring D is a 1,4-phenylene group, or a 1,4-naphthylene group; and preferably a 1,4-naphthylene group.

Group (III): dichroic azo dyes represented by the following general formula [III-1];

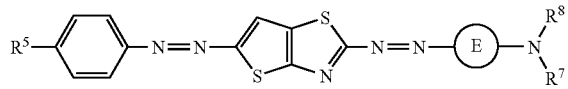

[III-1]

(where $R^5$ represents an alkyl group having 1 to 10 carbon atoms, an alkoxy group having 1 to 10 carbon atoms, an alkoxy-alkyl group having 2 to 12 carbon atoms; and a cycloalkyl group or a phenyl group which may be substituted by these alkyl group, alkoxy group, and alkoxy-alkyl group;

$R^6$ represents a hydrogen atom, or an alkyl group having 1 to 10 carbon atoms;

in the case that $R^6$ is an alkyl group, $R^7$ represents an alkyl group having 1 to 10 carbon atoms, and the total carbon number by adding the carbon numbers of $R^6$ and $R^7$ is from 2 to 8;

in the case that $R^6$ is a hydrogen atom, $R^7$ represents an alkyl group having 1 to 10 carbon atoms; or a cyclohexylmethyl group or a benzyl group whose 4-position may be substituted by a substituent R; here, R represents an alkyl group having 1 to 10 carbon atoms; an alkoxy group having 1 to 10 carbon atoms; an alkoxy-alkyl group having 2 to 12 carbon atoms; and a cycloalkyl group or a phenyl group which may be substituted by these alkyl group, alkoxy group, and alkoxy-alkyl group;

Ring E represents a 1,4-phenylene group, or a 1,4-naphthylene group).

The dye represented by the general formula [III-1] which constructs Group (III) is usually blue. In the general formula [III-1], $R^5$ includes a straight-chain or branched-chain alkyl group having 1 to 10 carbon atoms such as a methyl group, an ethyl group, a propyl group, a butyl group, a pentyl group, a hexyl group, an octyl group, a nonyl group, and a dodecyl group; a straight-chain or branched-chain alkoxy group having 1 to 10 carbon atoms such as a methoxy group, an ethoxy group, a propoxy group, a butoxy group, a pentyloxy group, and an octyloxy group; a straight-chain or branched-chain alkoxy-alkyl group having 2 to 12 carbon atoms such as a methoxymethyl group, a butoxymethyl group, an ethoxyethyl group, and a butoxyethyl group; a cycloalkyl group having 3 to 10 carbon atoms which may be substituted by these alkyl group, alkoxy group, and alkoxy-alkyl group; or a phenyl group which may be substituted by these alkyl group, alkoxy group, and alkoxy-alkyl group.

Preferred $R^5$ includes a straight-chain or branched-chain alkyl group having 1 to 10 carbon atoms; a straight-chain or branched-chain alkoxy group having 1 to 10 carbon atoms; a cyclohexyl group which is substituted by these alkyl group or alkoxy group; and a phenyl group which is substituted by these alkyl group and alkoxy group; and more preferably includes a straight-chain or branched-chain alkyl group having 1 to 10 carbon atoms; a straight-chain or branched-chain alkoxy group having 1 to 10 carbon atoms; and a cyclohexyl group which is substituted by these alkyl group and alkoxy group. In the case that cyclohexyl group is substituted, its substitution position is preferably at the 4-position and the stereochemistry of cyclohexane ring is preferably the E-isomer.

$R^6$ is a hydrogen atom, or a straight-chain or branched-chain alkyl group having 1 to 10 carbon atoms. However, in the case that $R^6$ is a straight-chain or branched-chain alkyl group having 1 to 10 carbon atoms such as a methyl group, an ethyl group, a propyl group, a butyl group, a pentyl group, and a hexyl group, $R^7$ is also an alkyl group having 1 to 10 carbon atoms but the total carbon number by adding the carbon numbers of $R^6$ and $R^7$ is from 2 to 8.

On the other hand, in the case that $R^6$ is a hydrogen atom, $R^7$ represents a straight-chain or branched-chain alkyl group having 1 to 10 carbon atoms; or a cyclohexyl methyl group or a benzyl group whose 4-position may be substituted by a substituent R; here, R represents a straight-chain or branched-chain alkyl group having 1 to 10 carbon atoms such as a methyl group, an ethyl group, a propyl group, a butyl group, a pentyl group, a hexyl group, an octyl group, a nonyl group, and a dodecyl group; a straight-chain or branched-chain alkoxy group having 1 to 10 carbon atoms such as a methoxy group, an ethoxy group, a propoxy group, a butoxy group, a pentyloxy group, and an octyloxy group; a straight-chain or branched-chain alkoxy-alkyl group having 2 to 12 carbon atoms such as a methoxymethyl group, a butoxymethyl group, an ethoxyethyl group, and a butoxyethyl group; a cycloalkyl group having 3 to 10 carbon atoms which may be substituted by these alkyl group, alkoxy group, and alkoxy-alkyl group; or a phenyl group which may be substituted by these alkyl group, alkoxy group, and alkoxy-alkyl group.

$R^6$ is preferably a hydrogen atom, and $R^7$ is preferably a straight-chain or branched-chain alkyl group having 1 to 10 carbon atoms; an alkyl group having 1 to 10 carbon atoms which is unsubstituted or whose 4-position is straight-chain or branched-chain, or a cyclohexylmethyl group substituted by a cyclohexyl group which is substituted by these alkyl group; or a benzyl group substituted by a cyclohexyl group which is substituted by an alkyl group having 1 to 10 carbon atoms which is unsubstituted or whose 4-position is straight-chain or branched-chain or by these alkyl group. In the case that cyclohexyl group is substituted, its substitution position is preferably at the 4-position and the stereochemistry is preferably the E-isomer.

Ring E is a 1,4-phenylene group, or a 1,4-naphthylene group and preferably a 1,4-naphthylene group.

Group (IV): dichroic azo dyes represented by the following general formula [IV-1].

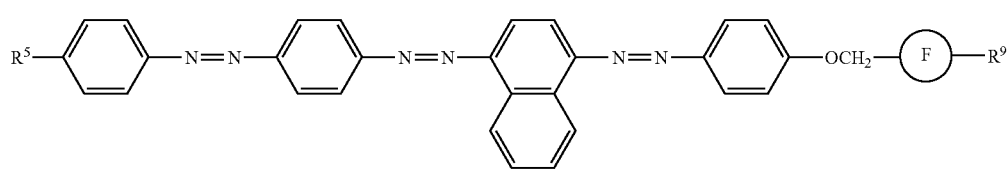

[IV-1]

(where $R^8$ and $R^9$ each independently represents an alkyl group having 1 to 10 carbon atoms, an alkoxy group having 1 to 10 carbon atoms, an alkoxy-alkyl group having 2 to 12 carbon atoms; and a cycloalkyl group or a phenyl group which may be substituted by these alkyl group, alkoxy group, and alkoxy-alkyl group;

Ring F represents a 1,4-cyclohexanediyl group, or a 1,4-phenylene group).

The dye represented by the general formula [IV-1] which constructs Group (IV) is usually orange. In the general formula [IV-1], $R^8$ and $R^9$ each independently includes a straight-chain or branched-chain alkyl group having 1 to 10 carbon atoms such as a methyl group, an ethyl group, a propyl group, a butyl group, a pentyl group, a hexyl group, an octyl group, a nonyl group, and a dodecyl group; a straight-chain or branched-chain alkoxy group having 1 to 10 carbon atoms such as a methoxy group, an ethoxy group, a propoxy group, a butoxy group, a pentyloxy group, and an octyloxy group; a straight-chain or branched-chain alkoxy-alkyl group having 2 to 12 carbon atoms such as a methoxymethyl group, a butoxymethyl group, an ethoxyethyl group, and a butoxyethyl group; a cycloalkyl group having 3 to 10 carbon atoms which may be substituted by these alkyl group, alkoxy group, and alkoxy-alkyl group; or a phenyl group which may be substituted by these alkyl group, alkoxy group, and alkoxy-alkyl group.

Preferred $R^8$ and $R^9$ each independently includes a straight-chain or branched-chain alkyl group having 1 to 10 carbon atoms; a straight-chain or branched-chain alkoxy group having 1 to 10 carbon atoms; a cyclohexyl group which is substituted by these alkyl group and alkoxy group; or a phenyl group which is substituted by these alkyl group and alkoxy group; and more preferably includes a straight-chain or branched-chain alkyl group having 1 to 10 carbon atoms; a straight-chain or branched-chain alkoxy group having 1 to 10 carbon atoms; and a cyclohexyl group which is substituted by these alkyl group or alkoxy group. In the case that a cyclohexyl group is substituted, its substitution position is preferably at the 4-position and the stereochemistry is preferably the E-isomer.

Ring F is a 1,4-cyclohexanediyl group, or a 1,4-phenylene group; and preferably a 1,4-cyclohexanediyl group, and more preferably an (E)-1,4-cyclohexanediyl group.

Specific Example of Dichroic Dye

Examples of the usable dyes of each group in the present invention will be collectively shown in following Tables 2 to 5; however, the usable dyes in the present invention are not limited to these unless going beyond the gist of the present invention.

TABLE 2

Group (I)

General formula [I-1]

| | $R^1$ | –(A)– | –(B)– | $R^2$ |
|---|---|---|---|---|
| [I-1-1] | n-C$_3$H$_7$ | cyclohexyl | cyclohexyl | cyclohexyl-n-C$_3$H$_7$ |
| [I-1-2] | n-C$_4$H$_9$O | phenyl | phenyl | O-n-C$_4$H$_9$ |
| [I-1-3] | n-C$_3$H$_7$-cyclohexyl | cyclohexyl | phenyl | cyclohexyl-n-C$_3$H$_7$ |
| [I-1-4] | C$_2$H$_5$OCH$_2$CH$_2$ | phenyl | phenyl | phenyl-O-n-C$_4$H$_8$ |

TABLE 3
Group (II)
General formula [II-1]
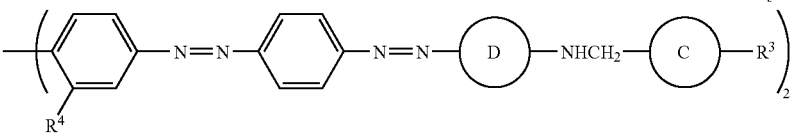
| | $R^4$ | —⟨D⟩— | —⟨C⟩— | $R^3$ |
|---|---|---|---|---|
| [II-1-1] | $CF_3$ |  |  | 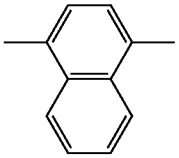 n-$C_3H_7$ |
| [II-1-2] | $CH_3$ | 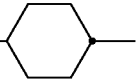 | 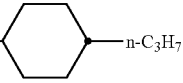 | O-n-$C_4H_8$ |
| [II-1-3] | $OCH_3$ | 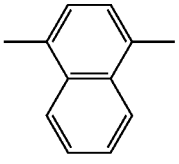 | 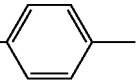 | $CH_2CH_2OC_2H_5$ |
| [II-1-4] | $CH_3$ | 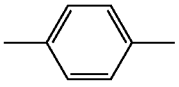 | 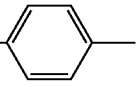 | n-$C_5H_{11}$ |
TABLE 4
Group (III)
General formula [III-1]
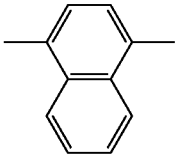
| | $R^5$ | —⟨E⟩— | $R^6$ | $R^7$ |
|---|---|---|---|---|
| [III-1-1] | n-$C_4H_9$ | 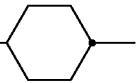 | H | 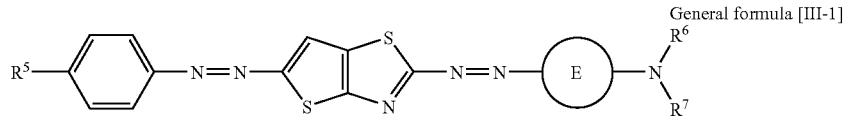 n-$C_5H_{11}$ |
| [III-1-2] | n-$C_3H_7$—— | 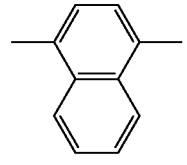 | H | 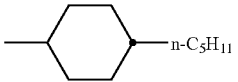 n-$C_3H_7$ |

TABLE 4-continued

Group (III)

General formula [III-1]

R⁵—[phenyl]—N=N—[thienothiazole]—N=N—(E)—N(R⁶)(R⁷)

| | R⁵ | —(E)— | R⁶ | R⁷ |
|---|---|---|---|---|
| [III-1-3] | n-C₃H₇—[cyclohexyl]— | [naphthyl] | H | —[phenyl]—[cyclohexyl]—n-C₅H₁₁ |
| [III-1-4] | n-C₄H₉ | —[phenyl]— | C₂H₅ | C₂H₅ |

TABLE 5

Group (IV)

General formula [IV-1]

R⁸—[phenyl]—N=N—[phenyl]—N=N—[naphthyl]—N=N—[phenyl]—OCH₂—(F)—R⁹

| | R⁸ | —(F)— | R⁹ |
|---|---|---|---|
| [IV-1-1] | n-C₅H₁₁ | —[phenyl]— | —[cyclohexyl]—n-C₅H₁₁ |
| [IV-1-2] | n-C₅H₁₁—[cyclohexyl]— | —[cyclohexyl]— | —[cyclohexyl]—n-C₃H₇ |
| [IV-1-3] | n-C₄H₉O | —[phenyl]— | —[phenyl]—O-n-C₄H₉ |
| [IV-1-4] | n-C₅H₁₁—[cyclohexyl]— | —[phenyl]— | CH₂CH₂OC₂H₅ |

<Solubility of Dichroic Dye>

As described in "Handbook of Liquid-crystal Device" by the 142$^{nd}$ Committee of Japan Society for the Promotion of Science, when the guest-host liquid-crystal element is used outside, it is necessary to fully understand the temperature dependence of the dye solubility in order to prevent the dye precipitate caused by a temperature drop. Generally, it is difficult to presume the solubility at low temperature only from the solubility around the room temperature, and thus the actual measurement of the solubility at low temperature is necessary.

The dichroic dye of the present invention indicates the superior solubility at low temperature with respect to the host liquid-crystal material to be described later. Here, the expression "the superior solubility" means to have the solubility of 0.1 weight % or more at −20° C., and preferably to have the solubility of 0.5 weight % or more at −20° C.

Liquid-Crystal Composition

<Host Liquid-Crystal>

Host liquid-crystal material used for the guest-host liquid-crystal composition of the present invention includes Np type liquid-crystal material and Nn type liquid-crystal material based on the liquid-crystal compounds represented by the following general formulas [V] to [IX].

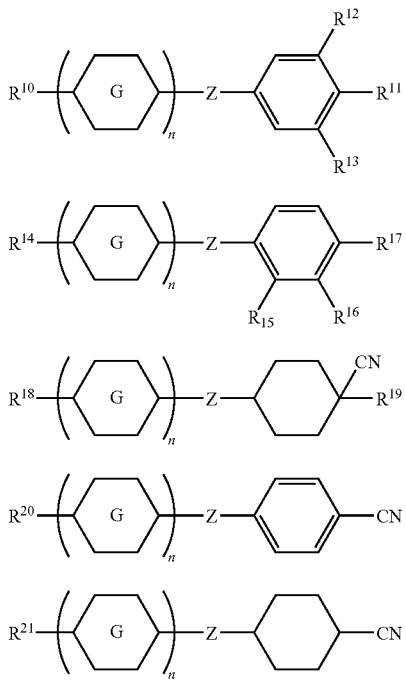

(where Ring G represents a cyclohexane ring, a benzene ring, a dioxane ring and a pyrimidine ring, and n represents an integer from 1 to 3;

—Z— represents a single bond, —COO—, —CH$_2$CH$_2$—, —CH=CH—, or —C≡C—;

$R^{11}$ represents a halogen atom such as a fluorine atom and a chlorine atom; a substituted alkyl group having 1 to 7 carbon atoms, a substituted alkoxy group, and a substituted alkenyl group each having a substituent of a halogen atom such as a fluorine atom and a chlorine atom; and a substituted cyclohexyl group or a substituted phenyl group each having a substituent of a substituted alkyl group, a substituted alkoxy group, and a substituted alkenyl group;

$R^{12}$ and $R^{13}$ each independently represents a hydrogen atom; and a halogen atom such as a fluorine atom and a chlorine atom;

$R^{15}$ and $R^{16}$ each independently represents a cyano group; and a halogen atom such as a fluorine atom, and a chlorine atom;

$R^{10}$, $R^{14}$, $R^{17}$, $R^{18}$, $R^{19}$, $R^{20}$, and $R^{21}$ each independently represents an alkyl group having 1 to 10 carbon atoms, an alkoxy group, an alkoxy-alkyl group, and alkenyl group).

Further, the abovementioned liquid-crystal composition may include additives such as an optical active substance including a cholesteryl nonanoate, an ultraviolet absorber, and an antioxidant.

<Composition>

The liquid-crystal composition of the present invention can be easily prepared by dissolving at least one dichroic dye selected from Group I, at least one dichroic dye selected from Group II and at least one dichroic dye selected from Group III, and optionally at least one dichroic dye selected from Group IV in the abovementioned host liquid-crystal compound, following the known method.

The used amount of each of the dye groups represented by Group I, Group II, Group III and Group IV is arbitrary selected according to a color phase to be obtained. In particular, in order to obtain a composition having a high-quality black color phase, when the total dye amount is 100 parts by weight, the preferable proportion consists of Group I dye of 5 to 35 parts by weight, Group II dye of 5 to 35 parts by weight, Group III dye of 15 to 40 parts by weight, and Group IV dye of 0 to 25 parts by weight. With respect to Group I dye of 1 part by weight, it is preferable that Group dye II is from 0.1 to 7 parts by weight, Group III dye is from 0.4 to 8 parts by weight, and Group IV dye is from 0 to 5 parts by weight.

With respect to the host liquid-crystal material, the total used amount of the dichroic dye is from 0.1 to 15 weight %, and preferably from 0.5 to 8 weight %. If the total used amount of the dichroic dye is less than 0.1 weight % with respect to the host liquid-crystal material, the color density is reduced during coloring. If the total used amount is more than 15 weight %, it affects viscosity of the liquid-crystal so that drive performance is deteriorated.

The guest-host liquid-crystal composition of the present invention can be easily obtained by mixing and dissolving the liquid-crystal composition, and the dichroic dye and various kinds of additives with the above-mentioned proportion using an operation such as suspension. In addition, within the range that the effects of the present invention are not impaired, the liquid-crystal composition of the present invention may include dichroic dyes other than those of above Groups (I) to (IV) according to the present invention.

The guest-host liquid-crystal composition which is prepared in this way indicates high order parameters in the wavelength range from 400 nm to 650 nm. Here, on the basis of an spectrographic measurement, an order parameter S of the dichroic dye can be obtained from the following equation described in "Handbook of Liquid-crystal Device" by the 142$^{nd}$ Committee of Japan Society for the Promotion of Science.

$$S=(A//-A\perp)/(2A\perp+A//)$$

Here, A// and A⊥ each represents the absorbance of the dye with respect to the light polarizing perpendicularly or in parallel to the alignment direction of the liquid-crystal. The order parameter of the dye theoretically takes a value from 0 to 1. As the value approaches 1, the contrast of the guest-host liquid-crystal improves.

The order parameter of the guest-host liquid-crystal composition of the present invention is generally 0.80 or more and preferably 0.83 or more.

The guest-host liquid-crystal composition of the present invention which is prepared in this way is supported between a pair of electrode substrates at least one of which is transparent. Therefore, various liquid-crystal elements can be composed by applying the guest-host effects such as Heilmeier type guest-host and phase transition type guest-host described on pages 315 to 329 of "Handbook of Liquid-crystal Device", the 142$^{nd}$ Committee of Japan Society for the Promotion of Science published by Nikkan Kogyo Shinbun, LTD.

In the present invention, various modes for the liquid-crystal elements are usable as described above. However, the phase transition mode which can be obtained by adding optical active substances to the nematic liquid-crystal composition is especially preferable for a reflective liquid-crystal display element, because the contrast is high and the display is luminous without using a polarizer.

Figure 2:
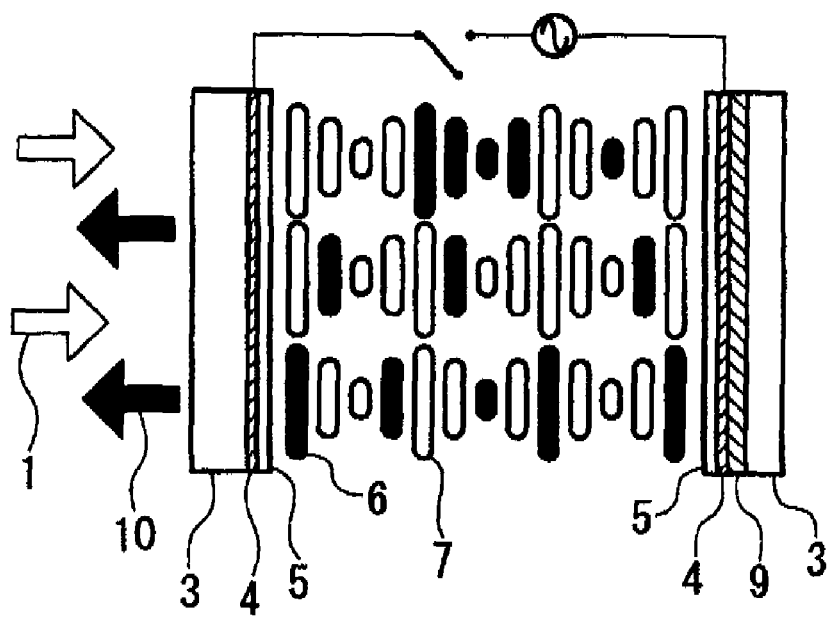
FIG. 2 is a schematic cross-sectional view of a no-voltage applied state of the reflective liquid-crystal element in the phase transition mode using the Np-type liquid-crystal composition as an example of the liquid-crystal element according to the present invention.

As an example of the liquid-crystal element of the present invention, FIGS. 1 and 2 illustrate schematic cross-sectional views of the guest-host liquid-crystal display element in the phase transition mode of active drive system. FIG. 1 shows the voltage applied state of the liquid-crystal display element and FIG. 2 shows the no-voltage applied state. In FIGS. 1 and 2, 1 represents an incident light, 3 represents a transparent glass substrate, 4 represents a transparent electrode, 5 represents an alignment film, 6 represents a liquid-crystal compound molecule, 7 represents a dichroic dye molecule, 9 represents a reflection layer, and 10 represents a reflected light.

In the no-voltage applied state (FIG. 2), a liquid-crystal compound 6 indicates a cholesteric phase. Similar to the liquid-crystal compound 6, the dichroic dye molecule 7 also indicates the cholesteric structure. Thus, even if the incident light 1 is a natural light, the incident light 1 is absorbed in the dye molecule 7 without using the polarizer. In the voltage applied state (FIG. 1), the liquid-crystal compound molecule 6 and the dichroic dye molecule 7 are aligned in an electric field direction so that the light is transmissive and reflected by the reflection layer 9. In this way, in the liquid-crystal element, the light transmission and the light absorption can be controlled according to the presence of the electric field.

Example

Hereinafter, an aspect of the present invention will be described with examples; however, the present invention is not limited to these unless going beyond the gist of the present invention.

A guest-host liquid-crystal composition and a liquid-crystal element were evaluated in the following way.

(1) Verification of Low-Temperature Storage Stability of a Dichroic Dye Composition with Respect to a Host Liquid-Crystal Compound When the guest-host liquid-crystal composition which had been prepared at room temperature with compositions indicated in the examples and the comparative example was left for 96 hours at 40° C. or less and then returned to the room temperature, the presence of precipitation was verified with visual observation.

Figure 3:
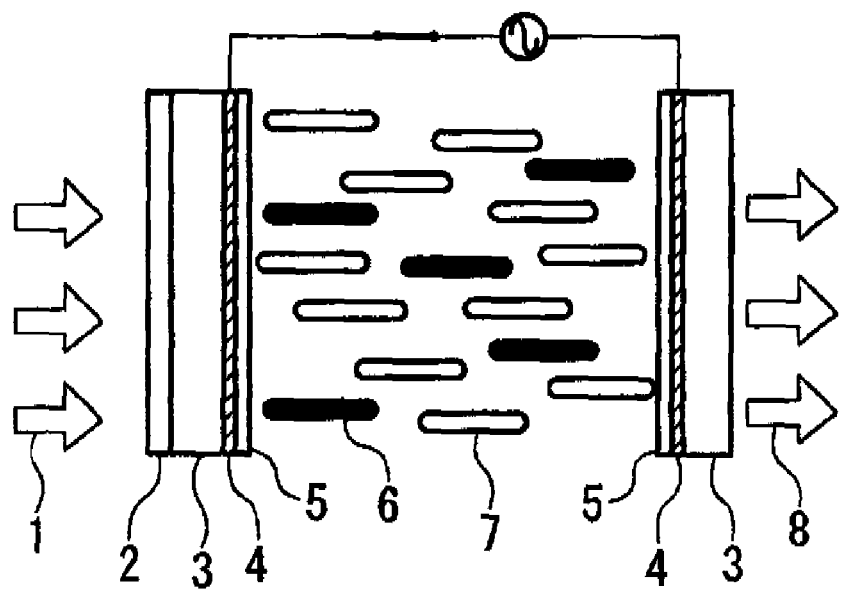
FIG. 3 is a schematic cross-sectional view of the voltage applied state of a transmissive liquid-crystal element in Heilmeier mode using the Np-type liquid-crystal composition as an example of the liquid-crystal element according to the present invention.
Figure 4:
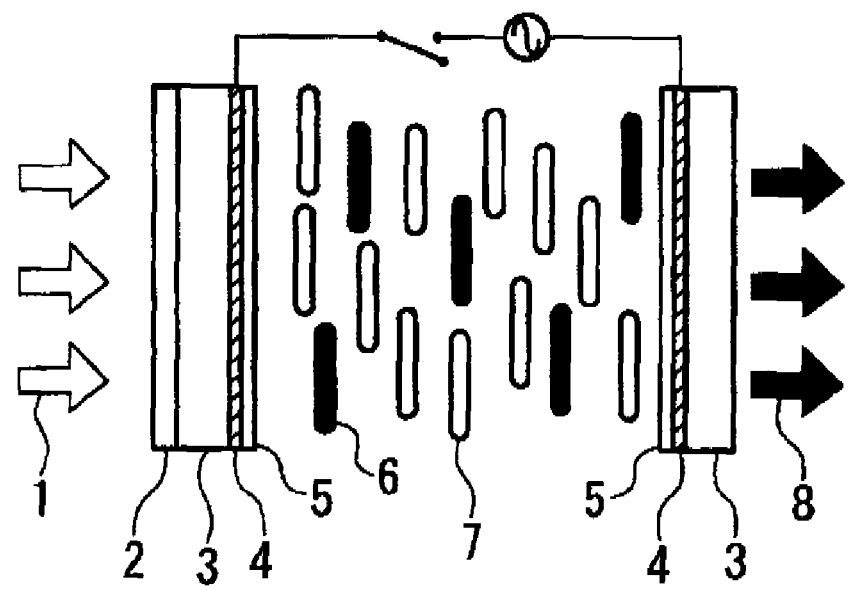
FIG. 4 is a schematic cross-sectional view of the no-voltage applied state of the transmissive liquid-crystal element in Heilmeier mode using the Np-type liquid-crystal composition as an example of the liquid-crystal element according to the present invention.

(2) Fabrication of the Liquid-Crystal Element Using the Guest-Host Liquid-Crystal Composition and Measurement of Order Parameters In the guest-host liquid-crystal composition which had been prepared as indicated in the examples and the comparative example, polyimide-based resin was applied to planes including the transparent electrode 4 and being in contact with the liquid-crystal composition (including the liquid-crystal compound molecule 6 and the dichroic dye molecule 7) as illustrated in FIGS. 3 and 4 and then dried. After that, the guest-host liquid crystal composition was enclosed in a cell in which the two homogeneously aligned glass substrates 3 by rubbing were respectively disposed facing each other so as to inwardly locate the alignment processed planes (the alignment film 5) thereof; thereby the transmissive liquid-crystal element in Heilmeier mode was manufactured. In FIGS. 3 and 4, the members having the similar functions as those shown in FIGS. 1 and 2 are appended with the similar references. FIG. 3 illustrates the voltage applied state and FIG. 4 illustrates the no-voltage applied state.

The liquid-crystal composition in the abovementioned element takes a homogeneous alignment state to align in parallel and in a certain direction with respect to the planes of the liquid-crystal molecule electrode as shown in FIG. 4, and the dye molecule also takes the similar alignment following the host liquid-crystal composition. An absorption spectrum of the guest-host liquid-crystal element manufactured in this way was measured with use of a parallel polarized light and a perpendicular polarized light with respect to the alignment direction of the liquid-crystal molecule so that the absorbance of the dye A// and A⊥ with respect to the respective polarized lights were measured.

For measurement of the absorbance of the dye, the correction was made in the absorption by the liquid-crystal composition and the glass substrates, and the reflection loss of the element. Using the absorbance of the dye A// and A⊥ with respect to each of the polarized lights obtained in this way, the order parameters (S values) were calculated from the following equation.

$$S=(A//-A\perp)/(2A\perp+A//)$$

A number for the dichroic dye used in the following corresponds to the compound number indicated in Tables 2 to 5.

Example 1

A dichroic dye composition-1 of the following composition was dissolved in 100 g of n-type liquid-crystal compound based on fluorinated compounds commercially available under a product name of "MLC-2039" by Merck Ltd., Japan to prepare a liquid-crystal composition-1.

<Dye Composition-1 Composition>

[I-1-1]: 0.71 g

[II-1-1]: 0.95 g

[III-1-1]: 1.26 g

[IV-1-1]: 0.79 g

A dye represented by the following structural formula [X]: 0.709 g

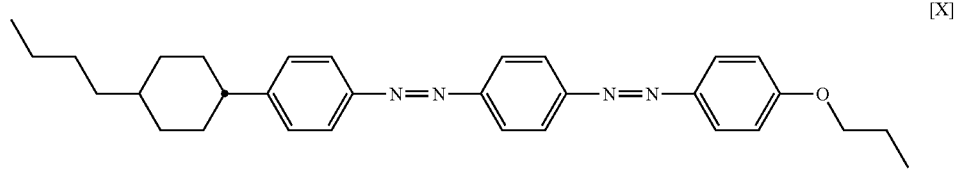

[X]

As a result of evaluating the obtained liquid-crystal composition-1 by the abovementioned dissolution measurement, no precipitates were found. Therefore, it was understood that the dye composition-1 had solubility of 4.2 weight % or more with respect to MLC-2039.

An element was fabricated by the abovementioned method using this liquid-crystal composition-1 so that the spectrum was measured and the order parameters (S values) were determined. As a result, the superior values were obtained in the wide wavelength range as indicated in Table 6.

Example 2

A dichroic dye composition-2 of the following composition was dissolved in 100 g of n-type liquid-crystal compound based on fluorinated compounds commercially available under a product name of "MLC-2039" by Merck Ltd., Japan to prepare a liquid-crystal composition-2.

<Dye Composition-2 Composition>

[I-1-1]: 0.91 g

[II-1-1]: 0.91 g

[III-1-1]: 1.26 g

[IV-1-1]: 0.76 g

A dye represented by the following structural formula [X]: 0.68 g

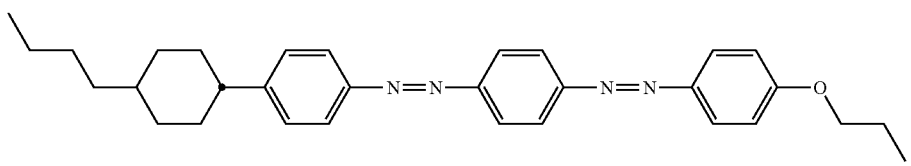

A dye represented by the following structural formula [XI]: 0.08 g

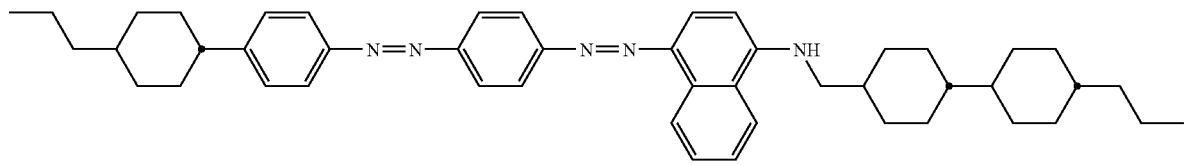

As a result of evaluating the obtained liquid-crystal composition-2 using the abovementioned dissolution measurement, no precipitates were found. Therefore, it was understood that the dye composition-2 had solubility of 4.4 weight % or more with respect to MLC-2039.

An element was fabricated with the abovementioned method using this liquid-crystal composition-2 so that the spectrum was measured and the order parameters (S values) were determined. The result was indicated in Table 6.

Comparative Example 1

Example 3 of Japanese Unexamined Patent Publication No. 2003-313881

A dichroic dye composition-3 of the following composition was dissolved in 100 g of n-type liquid-crystal compound based on fluorinated compounds commercially available under a product name of "MLC-2039" by Merck Ltd., Japan to prepare a liquid-crystal composition-3.

<Dye Composition-3 Composition>

A dye represented by the following structural formula [XII]: 0.34 g

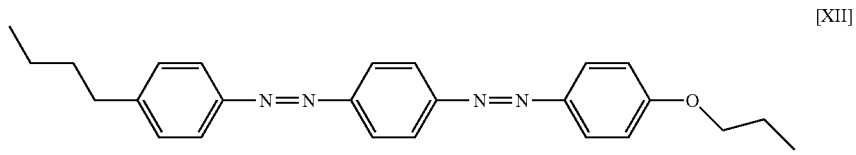

A dye represented by the following structural formula [XIII]: 1.08 g

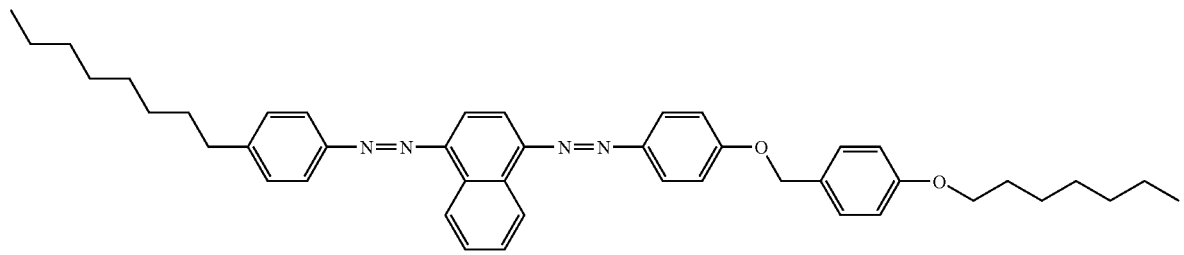

[XIII]

A dye represented by the following structural formula [XIV]: 0.34 g

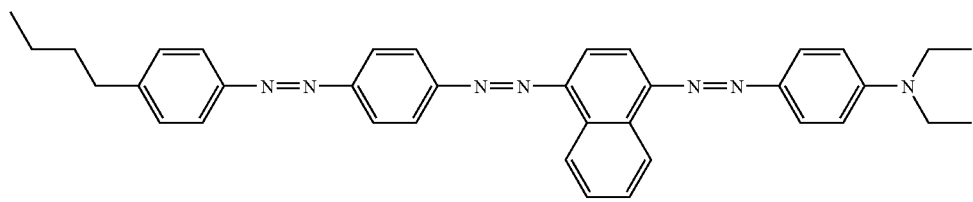

[XIV]

A dye represented by the following structural formula [XV]: 0.46 g

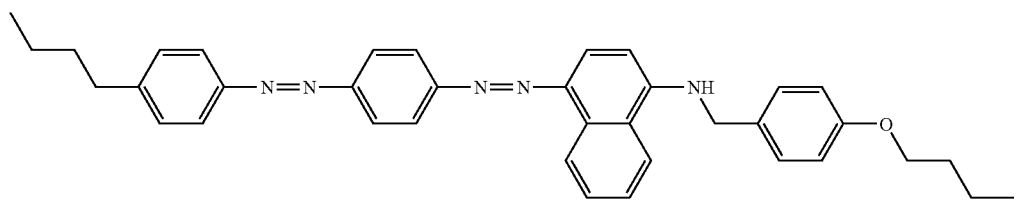

[XV]

A dye represented by the following structural formula [XVI]: 0.88 g

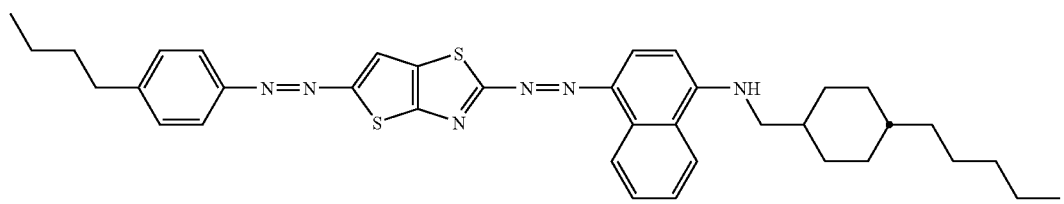

[XVI]

As a result of evaluating the obtained liquid-crystal composition-3 using the abovementioned dissolution measurement, no precipitates were found. Therefore, it was understood that the dye composition-3 had solubility of 3.0 weight % or more with respect to MLC-2039.

An element was fabricated by the abovementioned method using this liquid-crystal composition-3 so that the spectrum was measured and the order parameters (S values) were determined. The result was indicated in Table 6.

TABLE 6

| | Wavelength(nm) | | | | | |
|---|---|---|---|---|---|---|
| | 400 | 450 | 500 | 550 | 600 | 650 |
| Example 1 | 0.82 | 0.83 | 0.83 | 0.83 | 0.83 | 0.83 |
| Example 2 | 0.83 | 0.84 | 0.83 | 0.83 | 0.83 | 0.83 |
| Comparative Example 1 | 0.77 | 0.80 | 0.81 | 0.82 | 0.83 | 0.83 |

From Table 6, it was understood that the dye compositions in the example 1 and the example 2 indicated the superior solubility with respect to the liquid-crystal compound, and the superior low-temperature storage stability. At the same time, the dye compositions in the example 1 and the example 2 indicated the order parameter of 0.82 or more in the entire wavelength range from 400 nm to 650 nm.

On the other hand, it was understood that although the dye composition in the comparative example 1 also indicated the superior solubility at low temperature with respect to the liquid-crystal compound, the order parameters in the wavelength range from 400 nm to 650 nm, especially from 400 nm to 500 nm were clearly lower in comparison with those of the examples 1 and 2.

It should be understood by those skilled in the art that various modifications, combinations, sub-combinations and alterations may occur depending on design requirements and other factors insofar as they are within the scope of the appended claims or the equivalents thereof.

What is claimed is:

1. A dichroic dye composition comprising:
   at least one dichroic dye selected from Group (I);
   at least one dichroic dye selected from Group (II); and
   at least one dichroic dye selected from Group (III),
   wherein,
   Group (I) is a dichroic azo dye represented by the following general formula [I-1]:

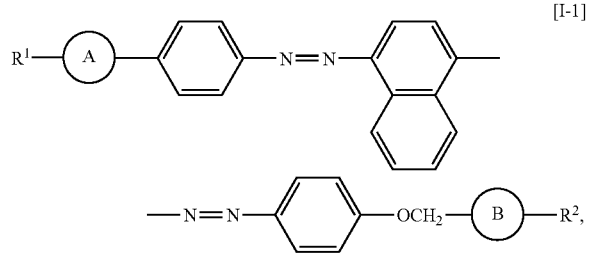

(each of $R^1$ and $R^2$ is an alkyl group having 1 to 10 carbon atoms, an alkoxy group having 1 to 10 carbon atoms, an alkoxy-alkyl group having 2 to 12 carbon atoms, and a cycloalkyl group or a phenyl group which may be substituted by these alkyl group, alkoxy group, or alkoxy-alkyl group, each of Ring A and Ring B is a 1,4-cyclohexanediyl group, or a 1,4-phenylene group, Group (II) is a dichroic azo dye represented by the following general formula [II-1]:

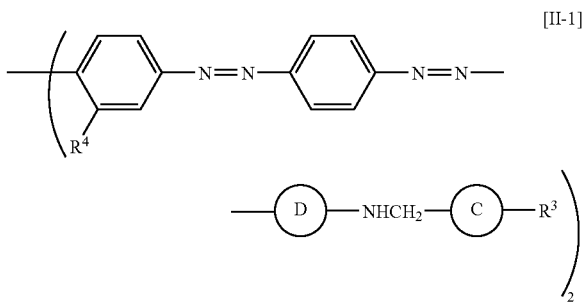

$R^3$ is an alkyl group having 1 to 10 carbon atoms, an alkoxy group having 1 to 10 carbon atoms, an alkoxy-alkyl group having 2 to 12 carbon atoms, a cycloalkyl group or a phenyl group which may be substituted by the alkyl group, the alkoxy group, and the alkoxy-alkyl group, $R^4$ is a hydrogen atom, a methyl group, a methoxy group, a halogen atom, or a fluoromethyl group, Ring C is a 1,4-cyclohexanediyl group, or a 1,4-phenylene group, Ring D is a 1,4-phenylene group, or a 1,4-naphthylene group, Group (III) is a dichroic azo dye represented by the following general formula [III-1];

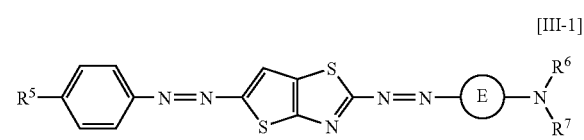

$R^5$ is an alkyl group having 1 to 10 carbon atoms, an alkoxy group having 1 to 10 carbon atoms, an alkoxy-alkyl group having 2 to 12 carbon atoms, a cycloalkyl group or a phenyl group which may be substituted by the alkyl group, the alkoxy group, and the alkoxy-alkyl group, $R^6$ is a hydrogen atom, or an alkyl group having 1 to 10 carbon atoms, and Ring E is a 1,4-phenylene group, or a 1,4-naphthylene group.

2. The dichroic dye composition according to claim 1 further comprising:
   at least one dichroic dye selected from Group (IV),
   wherein,
   Group (IV) is a dichroic azo dye represented by the formula [IV-1]:

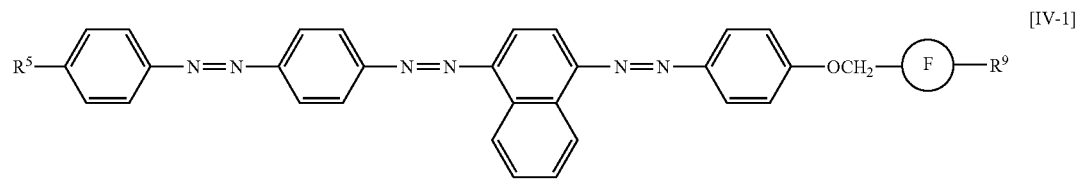

where each of $R^8$ and $R^9$ is an alkyl group having 1 to 10 carbon atoms, an alkoxy group having 1 to 10 carbon atoms, an alkoxy-alkyl group having 2 to 12 carbon atoms, and a cycloalkyl group or a phenyl group which may be substituted by the alkyl group, the alkoxy group, and the alkoxy-alkyl group, and Ring F is a 1,4-cyclohexanediyl group, or a 1,4-phenylene group.

3. A guest-host liquid-crystal composition comprising:
at least one dichroic dye selected from Group (I);
at least one dichroic dye selected from Group (II);
at least one dichroic dye selected from Group (III); and
a host liquid-crystal
wherein,
Group (I) is a dichroic azo dye the represented by the following general formula [I-1];

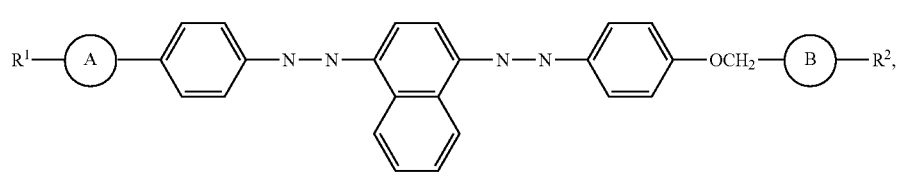
[I-1]

each of $R^1$ and $R^2$ each independently represents is an alkyl group having 1 to 10 carbon atoms, an alkoxy group having 1 to 10 carbon atoms, an alkoxy-alkyl group having 2 to 12 carbon atoms, and a cycloalkyl group or a phenyl group which may be substituted by these alkyl group, alkoxy group, or alkoxy-alkyl group, each of Ring A and Ring B each independently represents is a 1,4-cyclohexanediyl group, or a 1,4-phenylene group, Group (II) is a dichroic azo dye represented by the following general formula [II-1]:

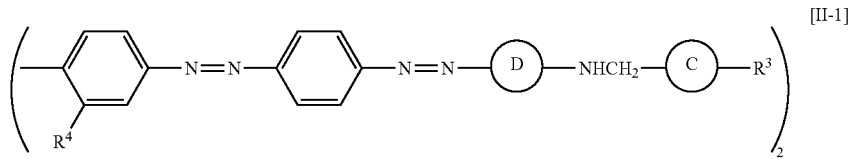
[II-1]

$R^3$ is an alkyl group having 1 to 10 carbon atoms, an alkoxy group having 1 to 10 carbon atoms, an alkoxy-alkyl group having 2 to 12 carbon atoms, a cycloalkyl group or a phenyl group which may be substituted by the these alkyl group, the alkoxy group, and the alkoxy-alkyl group, $R^4$ is represents a hydrogen atom, a methyl group, a methoxy group, a halogen atom, or a fluoromethyl group, Ring C is represents a 1,4-cyclohexanediyl group, or a 1,4-phenylene group, Ring D is represents a 1,4-phenylene group, or a 1,4-naphthylene group, Group (III) is a dichroic azo dye dyes represented by the following general formula [III-1];

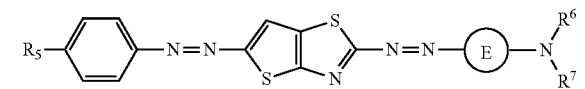
[III-1]

$R^5$ is an alkyl group having 1 to 10 carbon atoms, an alkoxy group having 1 to 10 carbon atoms, an alkoxy-alkyl group having 2 to 12 carbon atoms, and a cycloalkyl group or a phenyl group which may be substituted by the these alkyl group, the alkoxy group, and the alkoxy-alkyl group, $R^6$ is a hydrogen atom, or an alkyl group having 1 to 10 carbon atoms, and Ring E is a 1,4-phenylene group, or a 1,4-naphthylene group.

4. The guest-host liquid-crystal composition according to claim 3 further comprising:
at least one dichroic dye selected from Group (IV), shown below;
wherein,
Group (IV) is a dichroic azo dye represented by the following general formula [IV-1]:

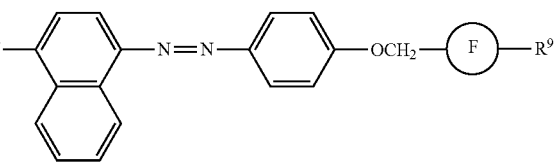
[IV-1]

each of $R^8$ and $R^9$ is an alkyl group having 1 to 10 carbon atoms, an alkoxy group having 1 to 10 carbon atoms, an alkoxy-alkyl group having 2 to 12 carbon atoms, and a cycloalkyl group or a phenyl group which may be substituted by the these alkyl group, the alkoxy group, and the alkoxy-alkyl group, and Ring F is represents a 1,4-cyclohexanediyl group, or a 1,4-phenylene group.

5. The guest-host liquid-crystal composition according to claim 3, wherein the host liquid-crystal is a fluorinated liquid-crystal composition.

6. A liquid-crystal element comprising a guest-host liquid-crystal composition, the guest-host liquid-crystal composition comprising:
   at least one dichroic dye selected from Group (I);
   at least one dichroic dye selected from Group (II); and
   at least one dichroic dye selected from Group (III)
   a host liquid-crystal
   wherein,
   the guest-host liquid-crystal composition is supported between a pair of electrode substrates at least one of which is transparent,
   Group (I) is a dichroic azo dye represented by the following general formula [I-1]:

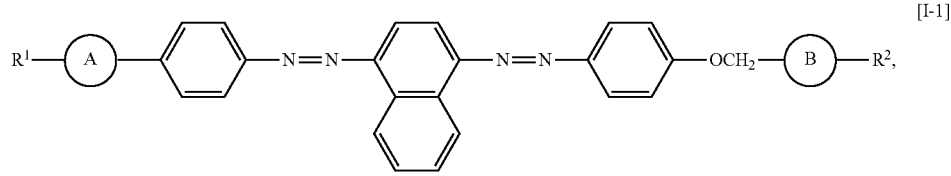

each of $R^1$ and $R^2$ each independently represents is an alkyl group having 1 to 10 carbon atoms, an alkoxy group having 1 to 10 carbon atoms, an alkoxy-alkyl group having 2 to 12 carbon atoms, and a cycloalkyl group or a phenyl group which may be substituted by these alkyl group, alkoxy group, or alkoxy-alkyl group, each of Ring A and Ring B each independently represents is a 1,4-cyclohexanediyl group, or a 1,4-phenylene group, Group (II) is a dichroic azo dye represented by the following general formula [II-1];

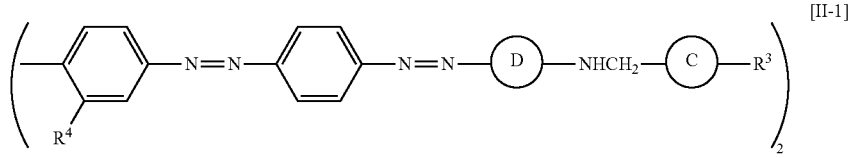

$R^3$ is an alkyl group having 1 to 10 carbon atoms, an alkoxy group having 1 to 10 carbon atoms, an alkoxy-alkyl group having 2 to 12 carbon atoms, a cycloalkyl group or a phenyl group which may be substituted by the these alkyl group, the alkoxy group, and the alkoxy-alkyl group, $R^4$ is represents a hydrogen atom, a methyl group, a methoxy group, a halogen atom, or a fluoromethyl group, Ring C is represents a 1,4-cyclohexanediyl group, or a 1,4-phenylene group, Ring D is represents a 1,4-phenylene group, or a 1,4-naphthylene group, Group (III) is a dichroic azo dye dyes represented by the following general formula [III-1]:

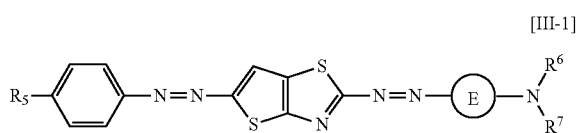

$R^5$ is an alkyl group having 1 to 10 carbon atoms, an alkoxy group having 1 to 10 carbon atoms, an alkoxy-alkyl group haying 2 to 12 carbon atoms, and a cycloalkyl group or a phenyl group which may be substituted by the these alkyl group, the alkoxy group, and the alkoxy-alkyl group, $R^6$ is a hydrogen atom, or an alkyl group having 1 to 10 carbon atoms, and Ring E is a 1,4-phenylene group, or a 1,4-naphthylene group.

7. The liquid-crystal element according to claim 6, the guest-host liquid-crystal composition further comprising:

at least one dichroic dye selected from Group (IV), shown below;
wherein,

Group (IV) is a dichroic azo dye represented by the following general formula [IV-1]:

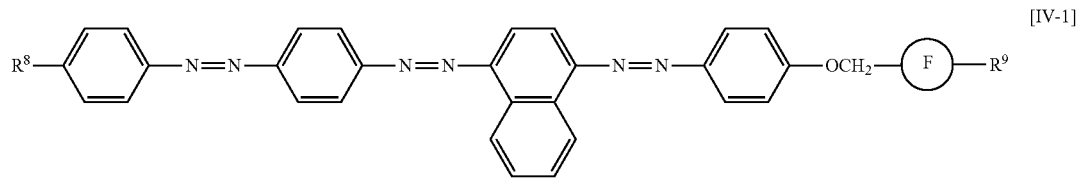

[IV-1]

each of $R^8$ and $R^9$ is an alkyl group having 1 to 10 carbon atoms, an alkoxy group having 1 to 10 carbon atoms, an alkoxy-alkyl group having 2 to 12 carbon atoms, and a cycloalkyl group or a phenyl group which may be substituted by the these alkyl group, the alkoxy group, and the alkoxy-alkyl group, and Ring F is represents a 1,4-cyclohexanediyl group, or a 1,4-phenylene group.

8. The dichroic dye composition according to claim 1, wherein in Group III:
$R^6$ is a hydrogen atom,
$R^7$ is an alkyl group having 1 to 10 carbon atoms, or a cyclohexylmethyl group or a benzyl group whose 4-position may be substituted by a substituent R,
R is an alkyl group having 1 to 10 carbon atoms, an alkoxy group having 1 to 10 carbon atoms; an alkoxy-alkyl group having 2 to 12 carbon atoms, and a cycloalkyl group or a phenyl group which may be substituted by the alkyl group, the alkoxy group, and the alkoxy-alkyl group, and
Ring E represents a 1,4-phenylene group, or a 1,4-naphthylene group.

9. The dichroic dye composition according to claim 1, wherein in Group III:
$R^6$ is an alkyl group,
$R^7$ is an alkyl group having 1 to 10 carbon atoms, and
the total carbon number by adding the carbon numbers of $R^6$ and $R^7$ is from 2 to 8.

10. The guest-host liquid-crystal composition according to claim 3, wherein in Group III:
$R^6$ is a hydrogen atom,
$R^7$ is an alkyl group having 1 to 10 carbon atoms, or a cyclohexylmethyl group or a benzyl group whose 4-position may be substituted by a substituent R,
R is an alkyl group having 1 to 10 carbon atoms, an alkoxy group having 1 to 10 carbon atoms, an alkoxy-alkyl group having 2 to 12 carbon atoms, and a cycloalkyl group or a phenyl group which may be substituted by the alkyl group, the alkoxy group, and the alkoxy-alkyl group, and
Ring E represents a 1,4-phenylene group, or a 1,4-naphthylene group.

11. The guest-host liquid-crystal composition according to claim 3, wherein in Group III:
$R^6$ is an alkyl group,
$R^7$ is an alkyl group having 1 to 10 carbon atoms, and
the total carbon number by adding the carbon numbers of $R^6$ and $R^7$ is from 2 to 8.

12. The liquid-crystal element according to claim 6, wherein in Group III:
$R^6$ is a hydrogen atom,
$R^7$ is an alkyl group having 1 to 10 carbon atoms, or a cyclohexylmethyl group or a benzyl group whose 4-position may be substituted by a substituent R,
R is an alkyl group having 1 to 10 carbon atoms, an alkoxy group having 1 to 10 carbon atoms; an alkoxy-alkyl group having 2 to 12 carbon atoms, and a cycloalkyl group or a phenyl group which may be substituted by the alkyl group, the alkoxy group, and the alkoxy-alkyl group, and
Ring E represents a 1,4-phenylene group, or a 1,4-naphthylene group.

13. The liquid-crystal element according to claim 6, wherein in Group III:
$R^6$ is an alkyl group,
$R^7$ is an alkyl group having 1 to 10 carbon atoms, and
the total carbon number by adding the carbon numbers of $R^6$ and $R^7$ is from 2 to 8.

* * * * *